(12) United States Patent
Hsu et al.

(10) Patent No.: US 9,226,354 B2
(45) Date of Patent: Dec. 29, 2015

(54) LIGHT-EMITTING DIODE LIGHTING DEVICE HAVING MULTIPLE DRIVING STAGES

(71) Applicant: IML International, Grand Cayman (KY)

(72) Inventors: Horng-Bin Hsu, Taipei (TW); Yi-Mei Li, New Taipei (TW); Yung-Hsin Chiang, New Taipei (TW)

(73) Assignee: IML International, Grand Cayman (KY)

( * ) Notice: Subject to any disclaimer, the term of this patent is extended or adjusted under 35 U.S.C. 154(b) by 73 days.

(21) Appl. No.: 14/277,029

(22) Filed: May 13, 2014

(65) Prior Publication Data

US 2014/0354164 A1 Dec. 4, 2014

Related U.S. Application Data

(60) Provisional application No. 61/830,180, filed on Jun. 3, 2013.

(51) Int. Cl.
| | |
|---|---|
| *H05B 37/02* | (2006.01) |
| *H02M 7/06* | (2006.01) |
| *H05B 41/36* | (2006.01) |
| *H05B 33/08* | (2006.01) |

(52) U.S. Cl.
CPC .............. *H05B 33/083* (2013.01); *Y02B 20/345* (2013.01); *Y02B 20/348* (2013.01)

(58) Field of Classification Search
CPC .......... H05B 33/0815; H05B 33/0845; H05B 33/0824; H05B 33/08; H05B 37/029; Y02B 20/347

USPC ............. 315/291, 307, 122, 185 R, 185, 193, 315/224, 308
See application file for complete search history.

(56) References Cited

U.S. PATENT DOCUMENTS

| | | | | |
|---|---|---|---|---|
| 7,723,926 | B2 * | 5/2010 | Mednik .............. | H05B 33/0818 315/247 |
| 2005/0012725 | A1 | 1/2005 | Iwami | |
| 2010/0194274 | A1 * | 8/2010 | Hoogzaad .......... | H05B 33/0803 315/51 |

(Continued)

FOREIGN PATENT DOCUMENTS

| | | |
|---|---|---|
| CN | 102612861 A | 7/2012 |
| JP | 2008277496 | 11/2008 |

(Continued)

*Primary Examiner* — Jimmy Vu
*Assistant Examiner* — Wei Chan
(74) *Attorney, Agent, or Firm* — Winston Hsu; Scott Margo (57) ABSTRACT

An LED lighting device includes a slave driving stage and a master driving stage. The slave driving stage includes a first luminescent device and a first current controller for providing a constant current setting in an ON phase. The master driving stage includes a second luminescent device and a current control unit having a second current controller and a current envelope controller. The second current controller provides a current envelope in the ON phase. The current envelope controller sets a level of the current envelope according to a rectified AC voltage. The driving current is regulated by the first current controller according to the constant current setting when the constant current setting is smaller than the level of the current envelope, or by the second current controller according to the current envelope when the level of the current envelope is smaller than the constant current setting.

11 Claims, 8 Drawing Sheets

(56) References Cited

U.S. PATENT DOCUMENTS

| | | | |
|---|---|---|---|
| 2010/0315013 A1 | 12/2010 | Li | |
| 2011/0089854 A1* | 4/2011 | Yang | H05B 33/0815 315/291 |
| 2011/0194311 A1* | 8/2011 | Gaknoki | H02M 7/217 363/21.12 |
| 2011/0254467 A1* | 10/2011 | Chiang | H05B 33/0821 315/297 |
| 2011/0260645 A1 | 10/2011 | Chen | |
| 2012/0139448 A1* | 6/2012 | Chiang | H05B 33/083 315/307 |
| 2013/0069547 A1* | 3/2013 | van de Ven | H05B 33/0809 315/188 |
| 2013/0200812 A1* | 8/2013 | Radermacher | H05B 33/08 315/186 |
| 2014/0139125 A1* | 5/2014 | Lee | H05B 33/0824 315/186 |

FOREIGN PATENT DOCUMENTS

| | | |
|---|---|---|
| KR | 19940004812 Y1 | 7/1994 |
| KR | 1019980079925 A | 11/1998 |
| KR | 1020120124840 A | 11/2012 |
| TW | 201247017 | 11/2012 |
| TW | I376979 | 11/2012 |
| TW | 201320816 | 5/2013 |

* cited by examiner

LIGHT-EMITTING DIODE LIGHTING DEVICE HAVING MULTIPLE DRIVING STAGES

CROSS REFERENCE TO RELATED APPLICATIONS

This application claims the benefit of U.S. provisional application No. 61/830,180 filed on 2013 Jun. 3.

BACKGROUND OF THE INVENTION

1. Field of the Invention

The present invention is related to an LED lighting device having multiple driving stages, and more particularly, to an LED lighting device having multiple driving stages for improving operational voltage range and line/load regulation.

2. Description of the Prior Art

Compared to traditional incandescent bulbs, light-emitting diodes (LEDs) are advantageous in low power consumption, long lifetime, small size, no warm-up time, fast reaction speed, and the ability to be manufactured as small or array devices. In addition to outdoor displays, traffic signs, and liquid crystal display (LCD) for various electronic devices such as mobile phones, notebook computers or personal digital assistants (PDAs), LEDs are also widely used as indoor/outdoor lighting devices in place of fluorescent of incandescent lamps.

An LED lighting device directly driven by a rectified alternative-current (AC) voltage usually adopts a plurality of LEDs coupled in series in order to provide required luminance. In a conventional method for driving an LED lighting device, the LEDs may be light up in stages in order to increase the effective operational voltage range. Line regulation is the ability of an LED lighting device to exhibit little change in brightness as the rectified AC voltage changes. Load regulation is the consistency in lamp-to-lamp brightness despite differences in the load voltage. Variations in line and load are similar in that a decrease in load voltage is effectively an increase in the rectified AC voltage (line voltage). Since the current is regulated independently in each stage of a prior art LED lighting device according the voltage established across each stage, the overall line/load regulation of the LED lighting device may not be able meet desired values. Therefore, there is a need for an LED lighting device capable of improving the effective operational voltage range and improving line/load regulation.

SUMMARY OF THE INVENTION

The present invention provides an LED lighting device having a slave driving stage and a master driving stage. The slave driving stage includes a first luminescent device; and a first current controller coupled in parallel to the first luminescent device and configured to provide a constant current setting in a first phase and turn off in a second phase. The a master driving stage includes a second luminescent device coupled in series to the first luminescent device for providing light according to driving current; and a current control unit coupled in series to the first and second luminescent devices. The current control unit includes a second current controller configured to provide a current envelope in the first phase and turn off in the second phase; and a current envelope controller configured to set a level of the current envelope. The driving current is regulated by the first current controller according to the constant current setting in the first phase at a specific time during a cycle of a rectified AC voltage when the constant current setting is smaller than the level of the current envelope at the specific time. The driving current is regulated by the second current controller according to the current envelope in the first phase when the level of the current envelope at the specific time is smaller than the constant current setting.

The present invention also provides an LED lighting device having multiple driving stages and including first to $(N+1)^{th}$ luminescent devices for providing light according to driving current and first to $N+1)^{th}$ current controllers. The first to $N^{th}$ current controllers are coupled in parallel with the first to $N^{th}$ luminescent devices, respectively, and configured to provide first to $N^{th}$ constant current settings in a first phase, respectively; and turn off in a second phase. The $(N+1)^{th}$ current controller is coupled in series to the first to $(N+1)^{th}$ luminescent devices and includes an $(N+1)^{th}$ current controller and a current envelope controller. The $(N+1)^{th}$ current controller is configured to provide a current envelope with $(N+1)$ current settings in the first phase and turn off in the second phase. The current envelope controller is configured to set the $(N+1)$ current settings of the current envelope, wherein N is an integer larger than 1; and at a specific time during a cycle of a rectified AC voltage, the driving current is regulated by a current controller among the first to $(N+1)^{th}$ current controllers which operates in the first mode and provides a smallest current setting among other current controllers operating in the first mode at the specific time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
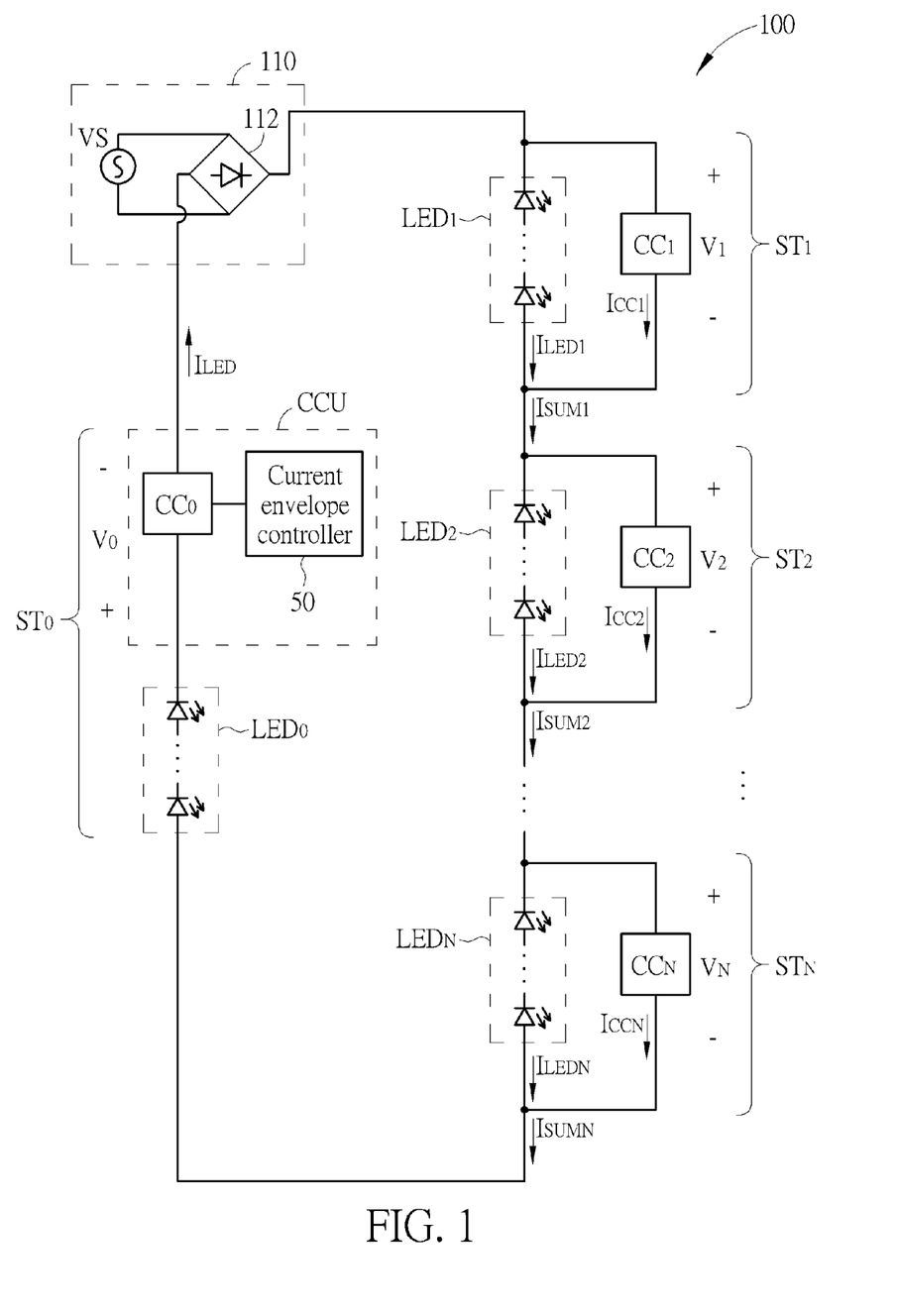
FIG. 1 is a diagram of an LED lighting device according to an embodiment of the present invention.

FIG. 1 is a diagram of an LED lighting device 100 according to an embodiment of the present invention. The LED lighting device 100 includes a power supply circuit 110, a master driving stage $ST_0$, and N slave driving stages $ST_1$~$ST_N$ (N is a positive integer). The power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the LED lighting device 100. In another embodiment, the power supply circuit 110 may receive any AC voltage VS, perform voltage conversion using an AC-AC converter, and rectify the converted AC voltage VS using the bridge rectifier 112, thereby providing the rectified AC voltage $V_{AC}$ whose value varies periodically with time. The configuration of the power supply circuit 110 does not limit the scope of the present invention.

The master driving stage $ST_0$ includes a luminescent device $LED_0$ and a current control unit CCU coupled in series. $V_0$ represents the voltage established across the current control unit CCU. $I_{LED}$ represents the current flowing through the master driving stage $ST_0$, which is also the overall current of the LED lighting device 100.

Each of the slave driving stages $ST_1 \sim ST_N$ includes a luminescent device and a current controller coupled in parallel. $LED_1 \sim LED_N$ represent the luminescent devices in the corresponding slave driving stages $ST_1 \sim ST_N$, respectively. $CC_1 \sim CC_N$ represent the current controllers in the corresponding slave driving stages $ST_1 \sim ST_N$, respectively. $V_1 \sim V_N$ represent the voltages established across the corresponding current controllers $CC_1 \sim CC_N$, respectively. $I_{SUM1} \sim I_{SUMN}$ represent the current flowing through the corresponding slave driving stages $ST_1 \sim ST_N$, respectively. $I_{CC1} \sim I_{CCN}$ represent the current flowing through the current controllers $CC_1 \sim CC_N$, respectively. $I_{LED1} \sim I_{LEDN}$ represent the current flowing through the luminescent devices $LED_1 \sim LED_N$, respectively.

In the embodiment of the present invention, each of the luminescent devices $LED_0 \sim LED_N$ may adopt a single LED or multiple LEDs coupled in series. FIG. 1 depicts the embodiment using multiple LEDs which may consist of single-junction LEDs, multi-junction high-voltage (HV) LEDs, or any combination of various types of LEDs. The types and configurations of the luminescent devices $LED_0 \sim LED_N$ do not limit the scope of the present invention. In a specific slave driving stage, the dropout voltage $V_{DROP}$ for turning on the corresponding current controller is smaller than the cut-in voltage $V_{CUT}$ for turning on the corresponding luminescent device.

Figure 2:
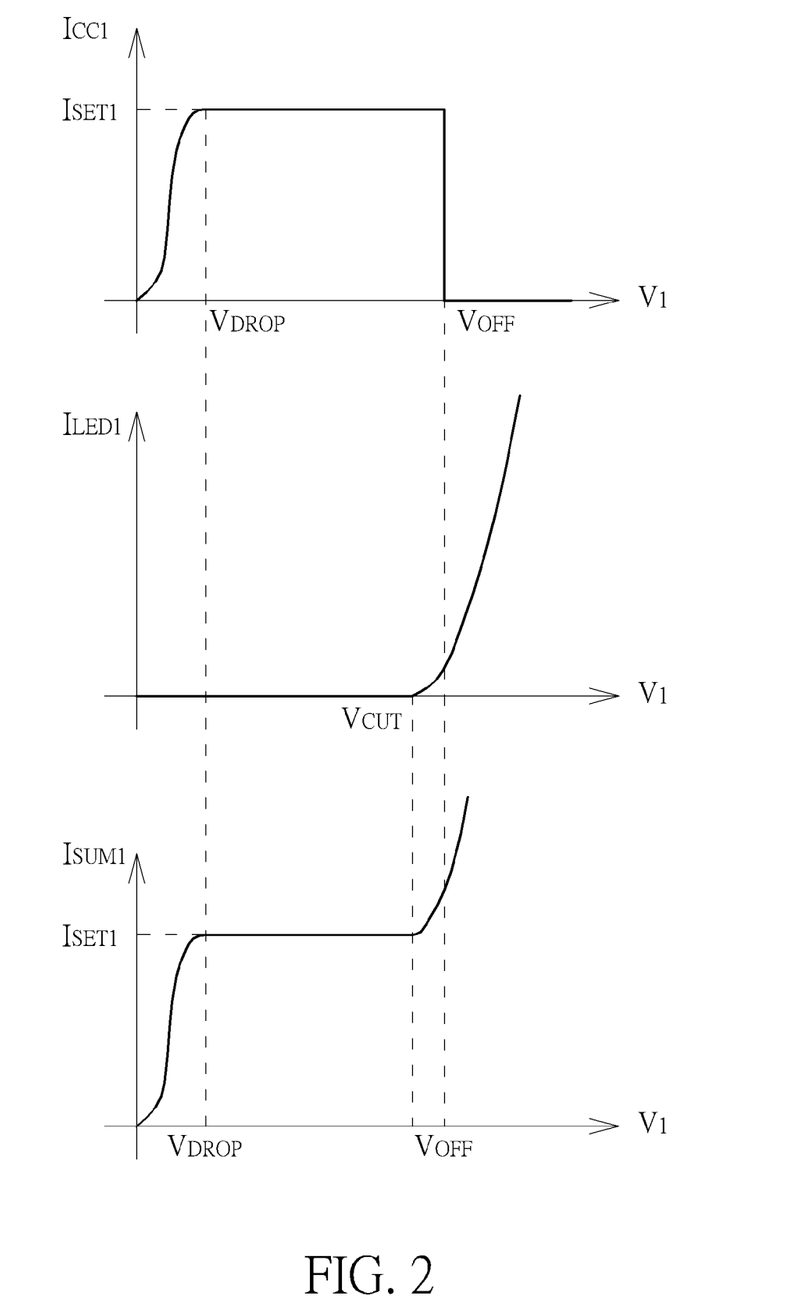
FIGS. 2 and 3 are diagrams illustrating the operation of the slave driving stages of the LED lighting device according to embodiments of the present invention.
Figure 3:
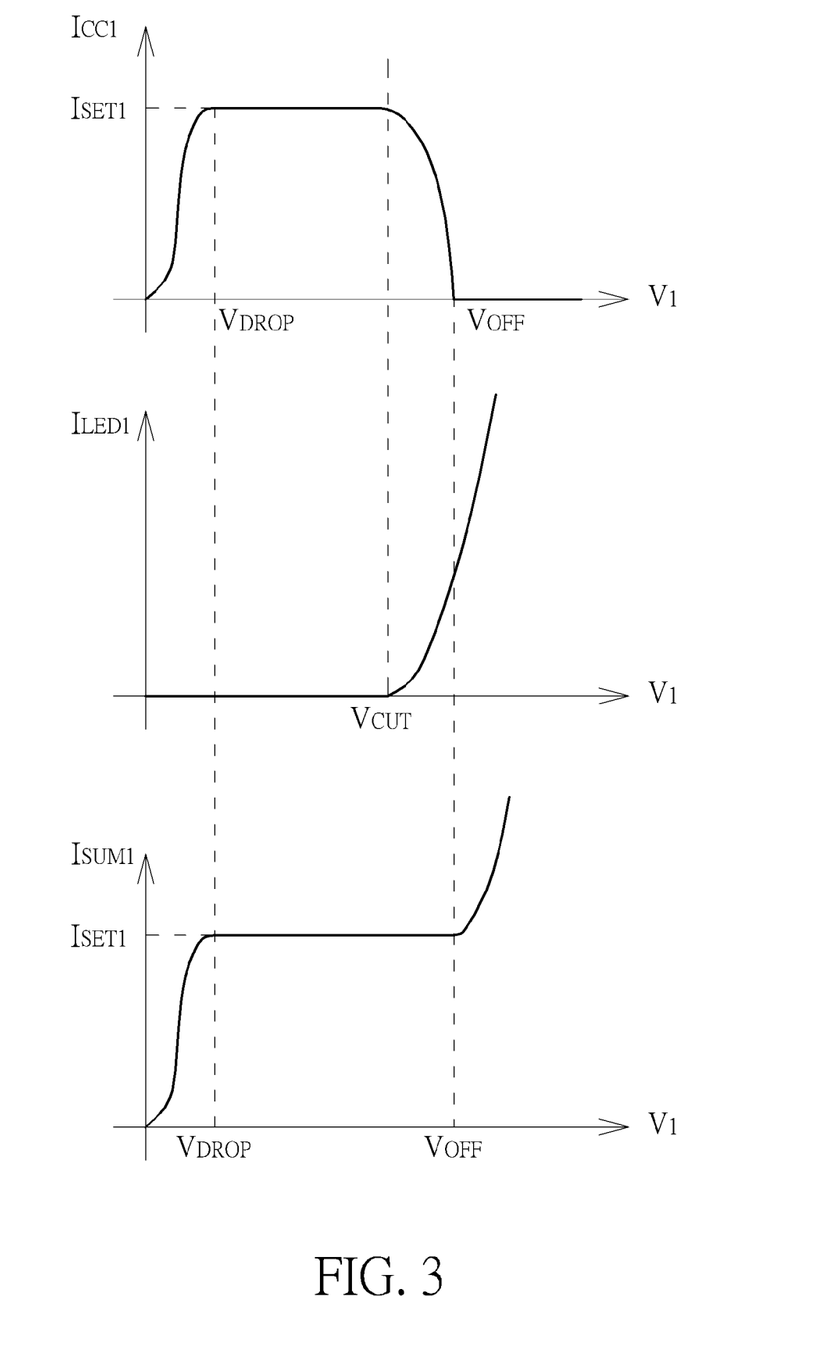

FIGS. 2 and 3 are diagrams illustrating the operation of the slave driving stages $ST_1 \sim ST_N$. The 1$^{st}$ slave driving stage $ST_1$ is used for illustrative purpose. When $0<V_1<V_{DROP}$, the current controller $CC_1$ is not completely turned on, and the luminescent device $LED_1$ remains off. Under such circumstance, the current controller $CC_1$ operates as a voltage-controlled device in a linear mode in which the current $I_{CC1}$ and the total current $I_{SUM1}$ change with the voltage $V_1$ in a specific manner, while the current $I_{LED1}$ remains zero.

When $V_1>V_{DROP}$, the current $I_{CC1}$ reaches the maximum current setting $I_{SET1\ of\ the}$ 1$^{st}$ slave driving stage $ST_1$, and the current controller $CC_1$ switches to a constant-current mode and functions as a current limiter. In the embodiment illustrated in FIG. 2, the current $I_{CC1}$ is clamped at the constant value $I_{SET1}$ instead of changing with the voltage $V_1$ in the constant-current mode. In the embodiment illustrated in FIG. 3 when $V_{DROP}<V_1<V_{CUT}$, the luminescent device $LED_1$ remains off and the current controller $CC_1$ is configured to clamp the current $I_{CC1}$ at the constant value $I_{SET1}$. In the embodiment illustrated in FIG. 3 when $V_1>V_{CUT}$, the luminescent device $LED_1$ is turned on and the current $I_{LED1}$ starts to increase. Therefore, the current controller $CC_1$ may decrease the current $I_{CC1}$ so that the total current $I_{SUM1}$ flowing through the 1$^{st}$ slave driving stage may be maintained at the constant value $I_{SET1}$ instead of changing with the voltage $V_1$ in the constant-current mode.

When the voltage $V_1$ reaches a turn-off voltage $V_{OFF}$ the current controller $CC_1$ switches to a cut-off mode. In other words, the current controller $CC_1$ functions as an open-circuited device, allowing the current $I_{LED1}$ and the current $I_{SUM1}$ to increase with the voltage $V_1$.

In the present invention, each of the current controller in the slave driving stages $ST_1 \sim ST_N$ is configured to operate in two phases. In an ON phase (linear mode or constant-current mode), the slave driving stages $ST_1 \sim ST_N$ provide respective current settings $I_{SET1} \sim I_{SETN}$, and the current $I_{SUM1} \sim I_{SUMN}$ mainly flow through the corresponding current controllers $CC_1 \sim CC_N$. In an OFF phase (cut-off mode), the current controllers $CC_1 \sim CC_N$ are turned off, and the current $I_{SUM1} \sim I_{SUMN}$ totally flow through the corresponding luminescent devices $LED_1 \sim LED_N$. Each of the slave driving stages $ST_1 \sim ST_N$ may adopt any device configured to achieve the above-mentioned two-phase operations, such as the I-V curves depicted in FIGS. 2 and 3. The configuration of the slave driving stages $ST_1 \sim ST_N$ and the I-V characteristics depicted in FIGS. 2 and 3 do not limit the scope of the present invention.

Figure 4:
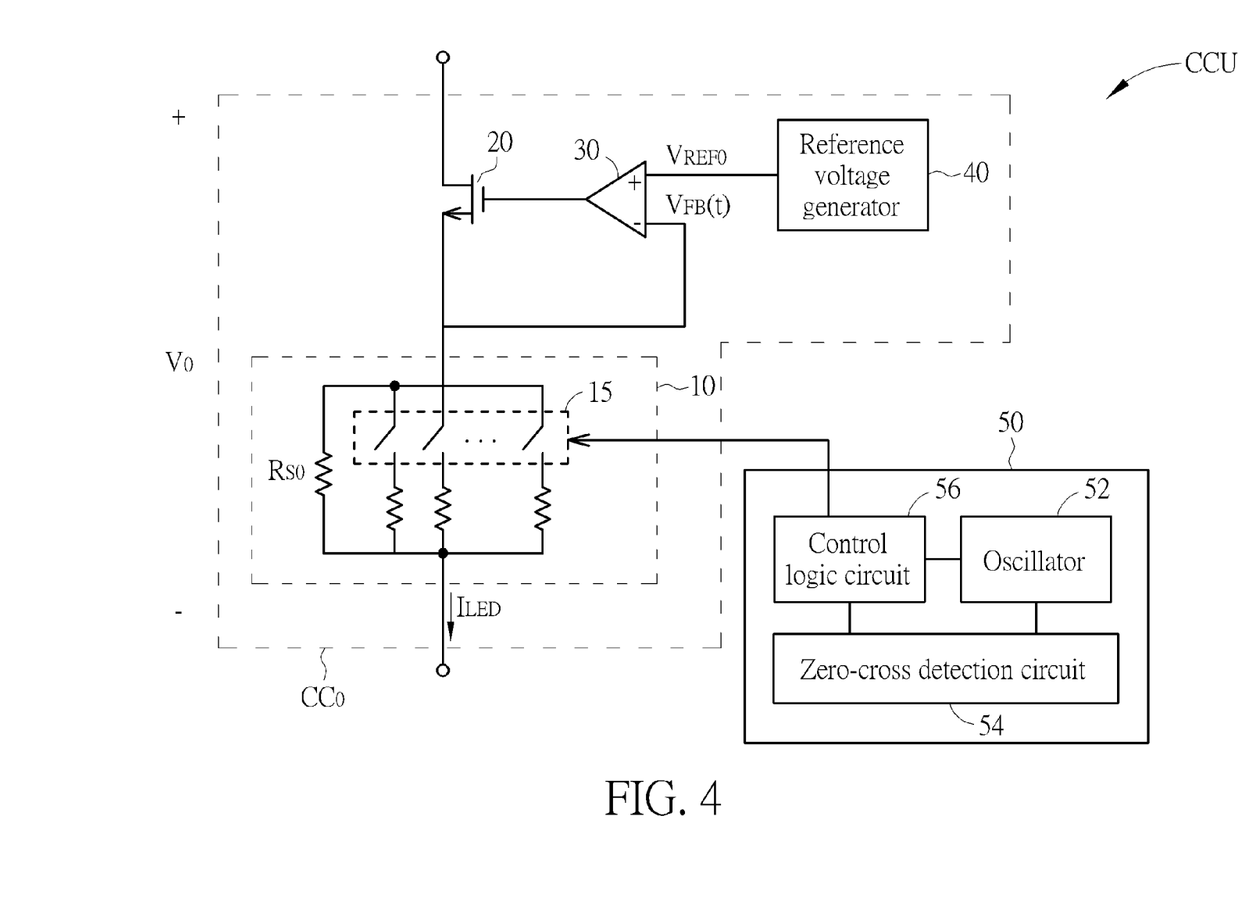
FIGS. 4~6 are diagrams of the current control unit in the master driving stage of the LED lighting device according to embodiments of the present invention.
Figure 5:
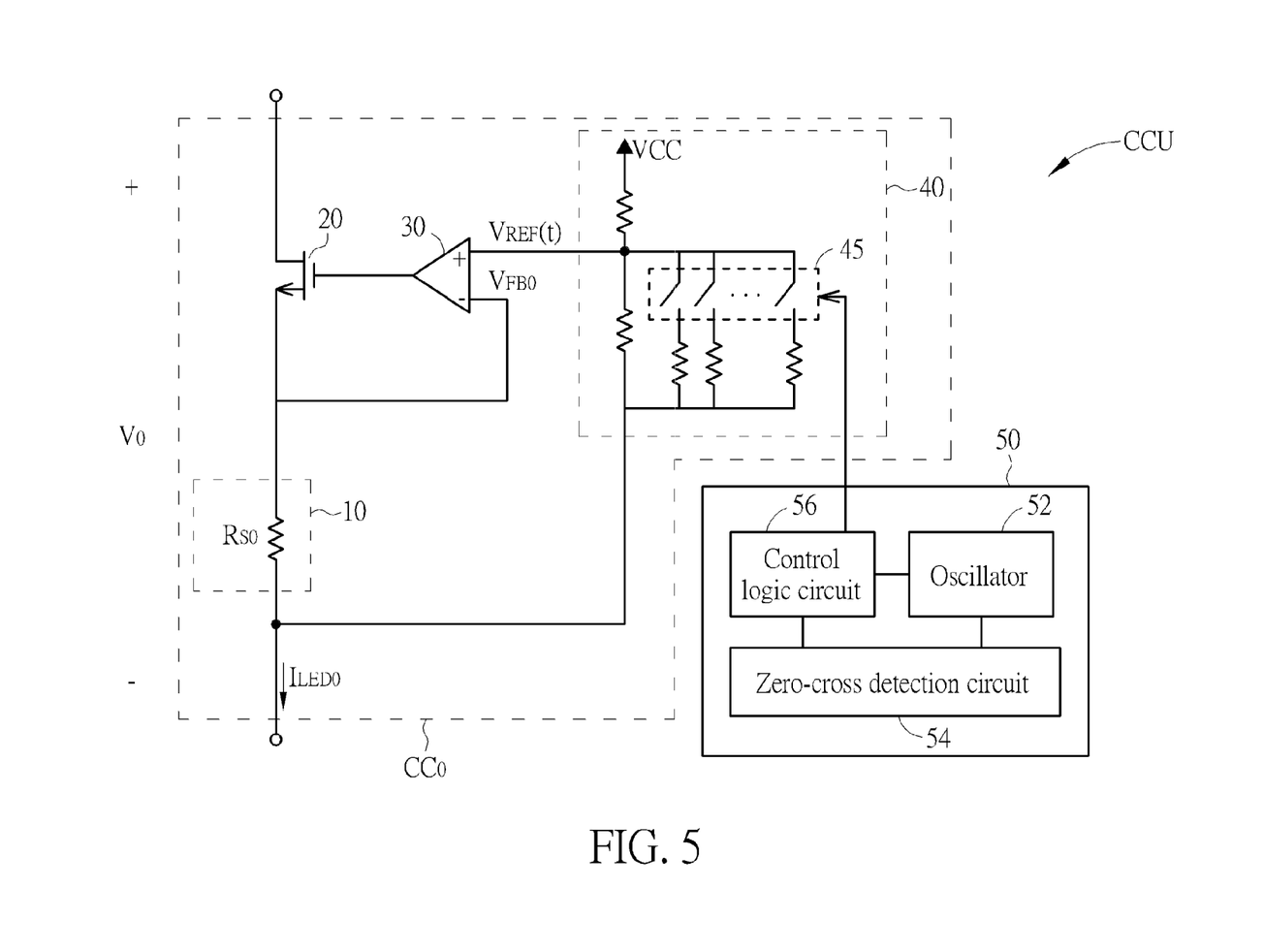
Figure 6:
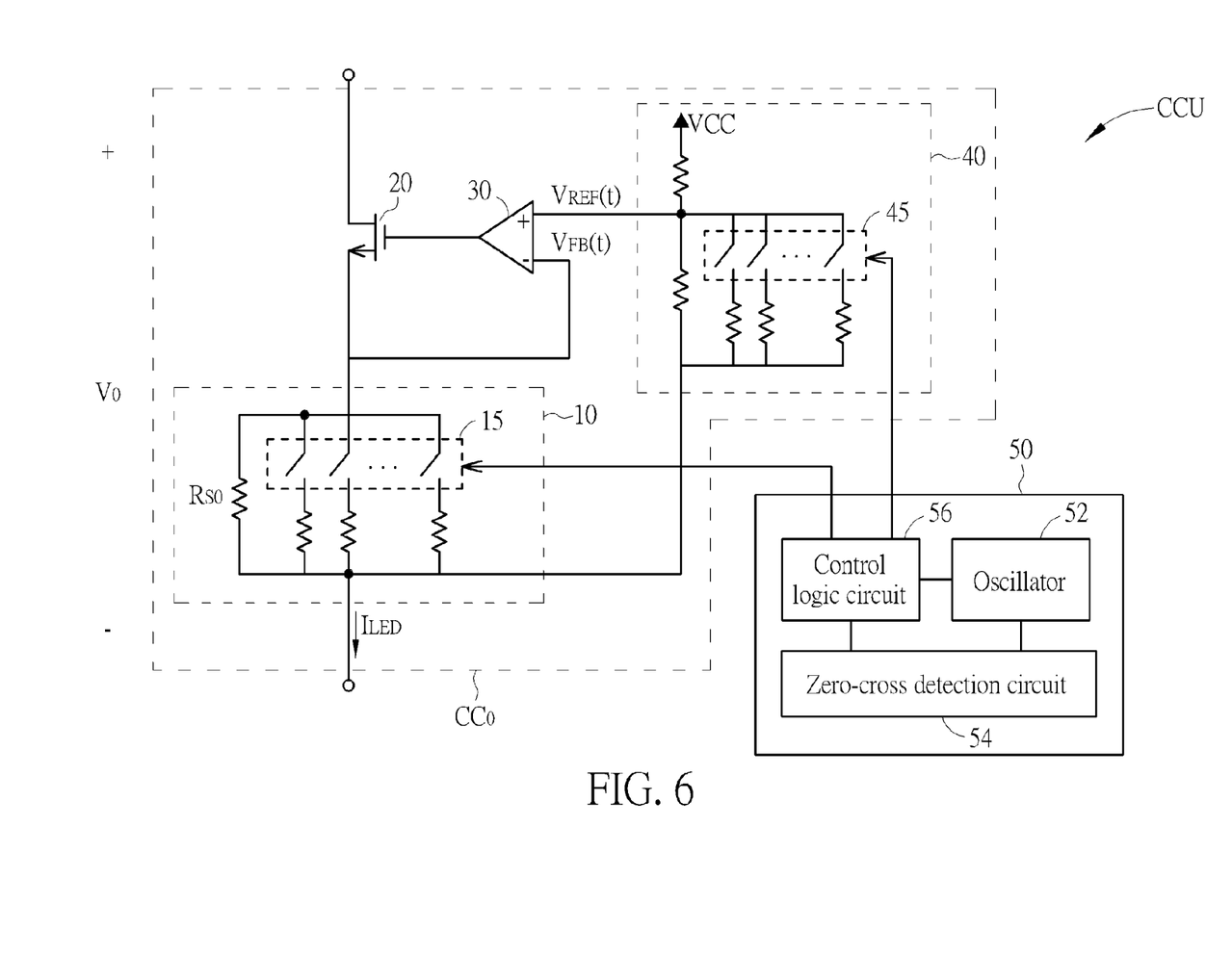

FIGS. 4-6 are diagrams of the current control unit CCU in the master driving stage $ST_0$ according to embodiments of the present invention. The current control unit CCU, including a current controller $CC_0$ and a current envelope controller 50, is configured to provide a current envelope $I_{SET}(t)$ with varying current settings.

The current controller $CC_0$ includes a current detector 10, a switch 20, a comparator 30 and a reference voltage generator 40. The equivalent resistance $R_S(t)$ of the current detector 10 may be a constant value $R_{S0}$ or varies according to the current envelope controller 50. The current detector 10 is configured to detect the current flowing through switch 20, thereby providing a corresponding feedback voltage $V_{FB}(t)$, which may be a constant value $V_{FB0}$ or varies with time according to the current envelope controller 50. The switch 20 may include a field effect transistor (FET), a bipolar junction transistor (BJT) or other devices having similar function. In FIGS. 4~6, an N-channel metal-oxide-semiconductor field effect transistor (N-MOSFET) is used for illustration, but does not limit the scope of the present invention. The reference voltage generator 40 is configured to provide a reference voltage $V_{REF}(t)$ which may be a constant value $V_{REF0}$ or varies with time according to the current envelope controller 50. The comparator 30 includes a positive input end coupled to the reference voltage $V_{REF}(t)$, a negative input end coupled to the feedback voltage $V_{FB}(t)$, and an output end coupled to the control end of the switch 20.

The comparator 30 is configured to adjust the current flowing through the switch 20 according to the relationship between the reference voltage $V_{REF}(t)$ and the feedback voltage $V_{FB}(t)$. When $V_{FB}(t)<V_{REF}(t)$, the comparator 30 is configured to raise its output voltage for increasing the current flowing through the switch 20 until the feedback voltage $V_{FB}(t)$ reaches the reference voltage $V_{REF}(t)$. When $V_{FB}(t)>V_{REF}(t)$, the comparator 30 is configured to decrease its output voltage for reducing the current flowing through the switch 20 until the feedback voltage $V_{FB}(t)$ reaches the reference voltage $V_{REF}(t)$. In other words, the current setting of the current envelope $I_{SET}(t)$ is equal to $(V_{REF}(t)/R_S(t))$ at a specific time t during a cycle of the rectified voltage $V_{AC}$.

The current envelope controller 50 includes an oscillator 52, a zero-cross detection circuit 54 and a control logic unit 56. The oscillator 52 is configured to provide internal clock signals based on which the current envelope controller 50 operates. The zero-cross detection circuit 54 is configured to detect the rising edge and falling edges of the current $I_{LED}$, thereby determining the zero-cross points of the rectified AC voltage $V_{AC}$. The control logic unit 56 is configured to adjust the values of $V_{REF}(t)$ and/or $R_S(t)$ of the current controller $CC_0$ for setting the levels of the current envelope $I_{SET}(t)$ In the embodiment illustrated in FIG. 4, the current detector 10 may include a plurality of resistors and a switching unit 15. The switching unit 15 includes a plurality of switches, each of which is turned on or off according to the current envelope controller 50 for adjusting the equivalent resistance $R_S(t)$ of the current detector 10. When the current envelope controller 50 is deactivated, the equivalent resistance of the current detector 10 is equal to $R_{S0}$ and the current setting of the current envelope $I_{SET}(t)$ is equal to a constant value $I_{MAX0}$ ($I_{MAX0}=V_{REF0}/R_{S0}$). When the current envelope controller 50 is activated, the equivalent resistance $R_S(t)$ of the current detector 10 may be adjusted and allow the current setting of the current envelope $I_{SET}(t)$ to vary with time, wherein $I_{SET}(t)=V_{REF0}/R_S(t)$.

In the embodiment illustrated in FIG. 5, the reference voltage generator 40 may include a plurality of resistors and a switching unit 45 forming an adjustable voltage-dividing circuit. The switching unit 45 includes a plurality of switches, each of which is turned on or off according to the current envelope controller 50 for adjusting the ratio of voltage division. When the current envelope controller 50 is deactivated, the voltage generator 40 outputs a constant reference voltage $V_{REF0}$ and the current setting of the current envelope $I_{SET}(t)$ is equal to a constant value $I_{MAX0}$ ($I_{MAX0}=V_{REF0}/R_{S0}$). When the current envelope controller 50 is activated, the reference voltage $V_{REF}(t)$ may be adjusted and allow the current setting of the current envelope $I_{SET}(t)$ to vary with time, wherein $I_{SET}(t)=V_{REF}(t)/R_{S0}$.

In the embodiment illustrated in FIG. 6, the current detector 10 may include a plurality of resistors and a switching unit 15. The switching unit 15 includes a plurality of switches, each of which is turned on or off according to the current envelope controller 50 for adjusting the equivalent resistance $R_S(t)$ of the current detector 10. The voltage generator 40 may include a plurality of resistors and a switching unit 45 forming an adjustable voltage-dividing circuit. The switching unit 45 includes a plurality of switches, each of which is turned on or off according to the current envelope controller 50 for adjusting the ratio of voltage division. When the current envelope controller 50 is deactivated, the equivalent resistance of the current detector 10 is equal to $R_{S0}$, the voltage generator 40 outputs a constant reference voltage $V_{REF0}$, and the current setting of the current envelope $I_{SET}(t)$ is equal to a constant value $I_{MAX0}$ ($I_{MAX0}=V_{REF0}/R_{S0}$). When the current envelope controller 50 is activated, the equivalent resistance $R_S(t)$ of the current detector 10 and the reference voltage $V_{REF}(t)$ may be adjusted and allow the current setting of the current envelope $I_{SET}(t)$ to vary with time, wherein $I_{SET}(t)=V_{REF}(t)/R_S(t)$.

Figure 7:
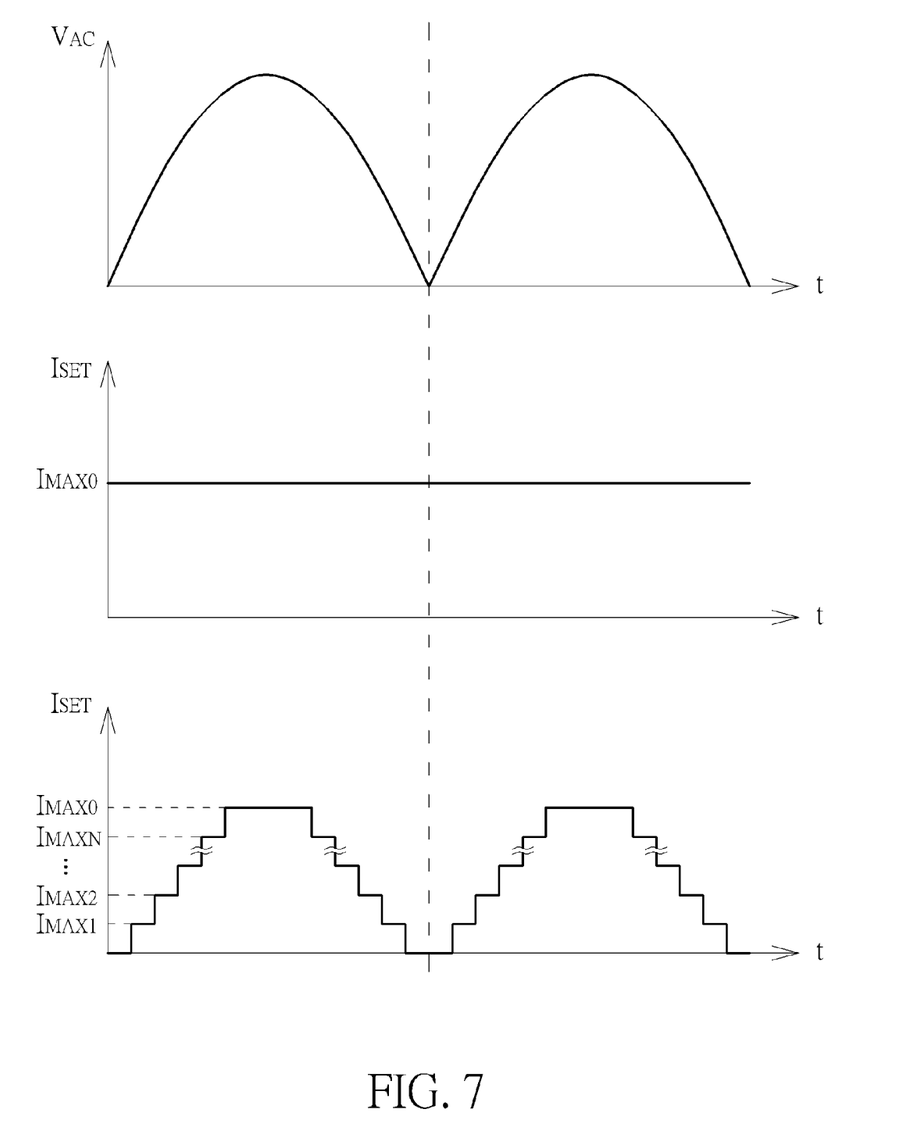
FIG. 7 is a diagram illustrating the operation of the current control unit in the master driving stage of the LED lighting device according to an embodiment of the present invention.

FIG. 7 is a diagram illustrating the operation of the current control unit CCU in the master driving stage $ST_0$ according to an embodiment of the present invention. When the current envelope controller 50 is deactivated, the current control unit CCU is configured to provide the current envelope $I_{SET}(t)$ with a constant current setting $I_{MAX0}$ which does not vary with the rectified AC voltage $V_{AC}$, as depicted in the middle of FIG. 7. When the current envelope controller 50 is activated, the current control unit CCU is configured to provide the current envelope $I_{SET}(t)$ with various current settings whose value ranges between $I_{MAX0} \sim I_{MAXN}$, as depicted at the bottom of FIG. 7. In the present invention, the current settings of the current controllers $CC_0 \sim CC_N$ have the following relationship:

$$I_{MAX0} > I_{SETN} > I_{MAXN} > \ldots > I_{SET2} > I_{MAX2} > I_{SET1} > I_{MAX1}.$$

FIGS. 8~11 are diagrams illustrating the operation of the LED lighting device 100. The embodiment when N=2 is used for illustrative purpose. The current controllers $CC_0$ in the master driving stage $ST_0$ provides the current envelope $I_{SET}(t)$ with 3 current settings $I_{MAX0} \sim I_{MAX2}$, wherein $I_{MAX0} \sim I_{SET2} \sim I_{MAX2} \sim I_{SET1} \sim I_{MAX1}$.

Figure 8:
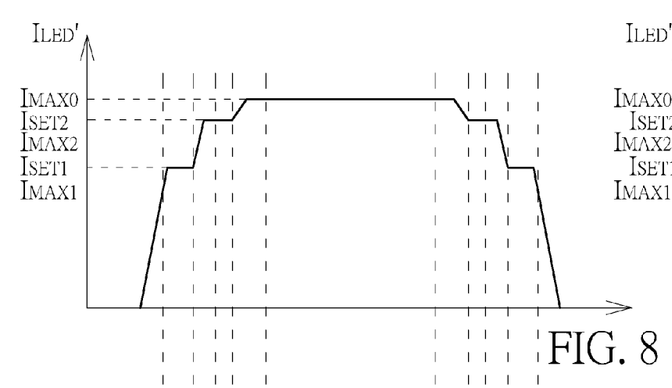
FIGS. 8~11 are diagrams illustrating the operation of the LED lighting device according to embodiments of the present invention.
Figure 9:
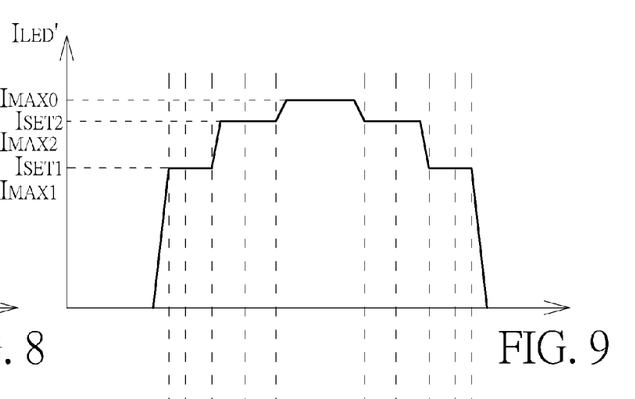
Figures 10, 11:
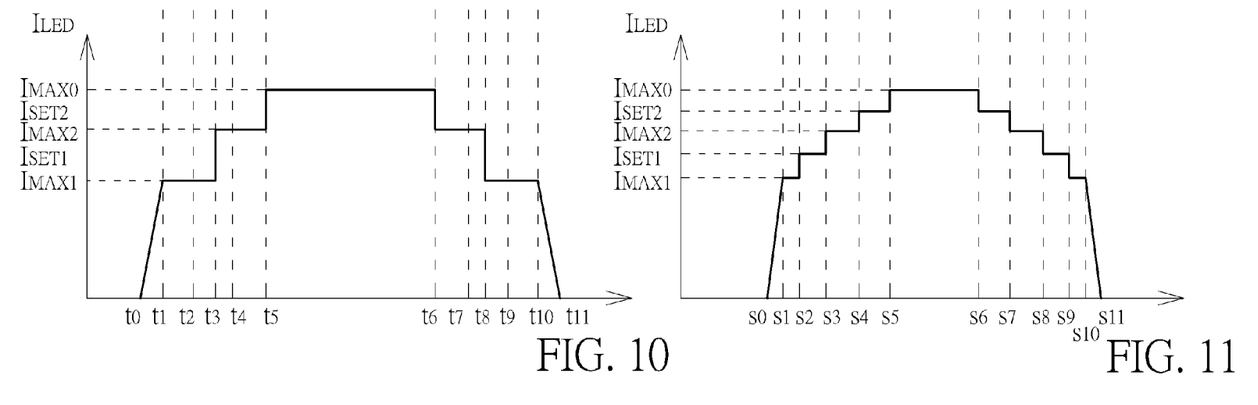

In FIGS. 8 and 10, the LED lighting device 100 is driven by the rectified AC voltage $V_{AC}$ at its upper bound, which may be due to a decrease in load voltage or an increase in the AC voltage VS. In FIGS. 9 and 11, the LED lighting device 100 is driven by the rectified AC voltage $V_{AC}$ at its lower bound, which may be due to an increase in load voltage or a decrease in the AC voltage VS. As depicted in FIGS. 8~11, the rectified AC voltage $V_{AC}$ at its upper bound results in a higher power factor than at its lower bound.

In FIGS. 8~9, $I_{LED}'$ represents the overall current of the LED lighting device 100 when the current envelope controller 50 is deactivated. The current controller $CC_1$ is configured to provide a constant current setting $I_{SET1}$ when operating in the ON phase. The current controller $CC_2$ is configured to provide a constant current setting $I_{SET2}$ when operating in the ON phase. The current controller $CC_0$ is configured to provide a current envelope with a constant current setting $I_{MAX0}$ when operating in the ON phase, as depicted in the middle of FIG. 7. The overall current $I_{LED}'$ of the LED lighting device 100 is regulated by an active current controller (in ON phase) which provides the lowest current setting.

Referring to FIG. 8, the values to which the overall current $I_{LED}'$ is clamped during a cycle of the rectified AC voltage $V_{AC}$ at its upper bound are listed in the following Table. 1. In FIG. 8 and Table. 1, $t_0 \sim t_{11}$ represent different time points during a cycle of the rectified AC voltage $V_{AC}$.

TABLE 1

|  | $t_0$ | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|---|
| $CC_1$ |  | ON |  |  |  | OFF |  |  |  |  | ON |  |
| $CC_2$ |  | ON |  | ON |  | OFF |  |  | ON |  | ON |  |
| $CC_0$ |  |  |  |  | ON ($I_{MAX0}$) |  |  |  |  |  |  |  |
| $I_{LED}'$ |  | $I_{SET1}$ |  | $I_{SET2}$ |  | $I_{MAX0}$ |  |  | $I_{SET2}$ |  | $I_{SET1}$ |  |

Between $t_0 \sim t_2$ and $t_9 \sim t_{11}$, the current controllers $CC_1$, $CC_2$ and $CC_0$ are turned on. The current $I_{LED}$ is regulated by the active current controllers $CC_1$ with the lowest current setting $I_{SET1}$ ($I_{SET1} < I_{SET2}$). Between $t_2 \sim t_4$ and $t_7 \sim t_9$, the current controllers $CC_2$ and $CC_0$ are turned on, and the current controller $CC_1$ is turned off. The current $I_{LED}'$ is regulated by the active current controllers $CC_2$ with the lowest current setting $I_{SET2}$ ($I_{SET2} < I_{MAX0}$) Between $t_4 \sim t_7$, the current controller $CC_0$ is turned on, and the current controllers $CC_1$ and $CC_2$ are turned off. The current $I_{LED}'$ is regulated by the only active current controller $CC_0$ with the current setting $I_{MAX0}$.

Referring to FIG. 9, the values to which the overall current $I_{LED}'$ is clamped during a cycle of the rectified AC voltage $V_{AC}$ at its lower bound are listed in the following Table. 2. In FIG. 9 and Table. 2, $s_0 \sim s_{11}$ represent different time points during a cycle of the rectified AC voltage $V_{AC}$.

TABLE 2

|  | $s_0$ | $s_1$ | $s_2$ | $s_3$ | $s_4$ | $s_5$ | $s_6$ | $s_7$ | $s_8$ | $s_9$ | $s_{10}$ | $s_{11}$ |
|---|---|---|---|---|---|---|---|---|---|---|---|---|
| $CC_1$ |  | ON |  |  |  | OFF |  |  |  |  | ON |  |
| $CC_2$ |  | ON |  | ON |  | OFF |  | ON |  |  | ON |  |
| $CC_0$ |  |  |  |  | ON ($I_{MAX0}$) |  |  |  |  |  |  |  |
| $I_{LED}'$ |  | $I_{SET1}$ |  | $I_{SET2}$ |  | $I_{MAX0}$ |  |  | $I_{SET2}$ |  | $I_{SET1}$ |  |

Between $s_0 \sim s_3$ and $s_8 \sim s_{11}$, the current controllers $CC_1$, $CC2$ and $CC_0$ are turned on. The current $I_{LED}'$ is regulated by the active current controllers $CC_1$ with the lowest current setting $I_{SET1}$ ($I_{SET1} < I_{MAX0}$). Between $s_3 \sim s_5$ and $s_6 \sim s_8$, the current controllers $CC_2$ and $CC_0$ are turned on, and the current controller $CC_1$ is turned off. The current $I_{LED}'$ is regulated by the active current controllers $CC_2$ with the lowest current setting $I_{SET2}$ ($I_{SET2}<I_{MAX0}$). Between $s_5$~$s_6$, the current controller $CC_0$ is turned on, and the current controllers $CC_1$ and $CC_2$ are turned off. The current $I_{LED}'$ is regulated by the only active current controller $CC_0$ with the current setting $I_{MAX0}$.

In FIGS. 10~11, $I_{LED}$ represents the overall current of the LED lighting device 100 when the current envelope controller 50 is activated. The current controller $CC_1$ is configured to provide a constant current setting $I_{SET1}$ when operating in the ON phase. The current controller $CC_2$ is configured to provide a constant current setting $I_{SET2}$ when operating in the ON phase. The current controller $CC_0$ is configured to provide a current envelope $I_{SET}(t)$ with various current settings ranging between $I_{MAX0}$~$I_{MAX2}$, as depicted at the bottom of FIG. 7. The overall current $I_{LED}$ of the LED lighting device 100 is regulated by an active current controller which provides the lowest current setting.

Referring to FIG. 10, the values to which the overall current $I_{LED}$ is clamped during a cycle of the rectified AC voltage $V_{AC}$ at its upper bound are listed in the following Table. 3. In FIG. 10 and Table. 3, $t_0$~$t_{11}$ represent different time points during a cycle of the rectified AC voltage $V_{AC}$.

TABLE 3

| | $t_0$ | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|---|
| $CC_1$ | | ON | | | | | OFF | | | | ON | |
| $CC_2$ | | ON | | ON | | | OFF | | ON | | ON | |
| $CC_0$ | | ON ($I_{MAX1}$) | | ON ($I_{MAX2}$) | | ON ($I_{MAX0}$) | | ON ($I_{MAX2}$) | | ON ($I_{MAX1}$) | | |
| $I_{LED}$ | | $I_{MAX1}$ | | $I_{MAX2}$ | | $I_{MAX0}$ | | $I_{MAX2}$ | | $I_{MAX1}$ | | |

Between $t_0$~$t_2$ and $t_9$~$t_{11}$, the current controllers $CC_1$, $CC_2$ and $CC_0$ are turned on. The current $I_{LED}$ is regulated by the active current controllers $CC_0$ with the lowest current setting $I_{MAX1}$ ($I_{MAX1}<I_{SET1}$). Between $t_2$~$t_4$ and $t_7$~$t_9$, the current controllers $CC_2$ and $CC_0$ are turned on, and the current controller $CC_1$ is turned off. The current $I_{LED}$ is regulated by the active current controllers $CC_0$ with the lowest current setting $I_{MAX1}$ ($I_{MAX1}<I_{SET2}$) between $t_2$~$t_3$ and $t_8$~$t_9$, and by the active current controllers $CC_0$ with the current setting $I_{MAX2}$ ($I_{MAX2}<I_{SET2}$) between $t_3$~$t_4$ and $t_7$~$t_8$. Between $t_4$~$t_7$, the current controller $CC_0$ is turned on, and the current controllers $CC_1$ and $CC_2$ are turned off. The current $I_{LED}$ is regulated by the only active current controller $CC_0$ with the current setting $I_{MAX2}$ between $t_4$~$t_5$ and $t_8$~$t_7$, and with the current setting $I_{MAX0}$ between $t_5$~$t_6$.

Referring to FIG. 11, the values to which the overall current ILED is clamped during a cycle of the rectified AC voltage VAC at its lower bound are listed in the following Table. 4. In FIG. 11 and Table. 4, s0~s11 represent different time points during a cycle of the rectified AC voltage VAC.

TABLE 4

| | $s_0$ | $s_1$ | $s_2$ | $s_3$ | $s_4$ | $s_5$ | $s_6$ | $s_7$ | $s_8$ | $s_9$ | $s_{10}$ | $s_{11}$ |
|---|---|---|---|---|---|---|---|---|---|---|---|---|
| $CC_1$ | | ON | | | | OFF | | | | ON | | |
| $CC_2$ | | ON | | | ON | OFF | | ON | | ON | | |
| $CC_0$ | ON ($I_{MAX1}$) | | ON ($I_{MAX2}$) | | ON ($I_{MAX0}$) | | | ON ($I_{MAX2}$) | | ON ($I_{MAX1}$) | | |
| $I_{LED}$ | $I_{MAX1}$ | $I_{SET1}$ | $I_{MAX2}$ | $I_{SET2}$ | $I_{MAX0}$ | | $I_{SET2}$ | $I_{MAX2}$ | $I_{SET1}$ | $I_{MAX1}$ | | |

Between s0~s3 and s8~s11, the current controllers CC1, CC2 and CC0 are turned on, and the current controller CC2 is turned off. The current ILED is regulated by the active current controllers CC0 with the lowest current setting IMAX1 (IMAX1<ISET1) between s0~s2 and s9~s11, and by the active current controllers CC1 with the lowest current setting ISET1 (ISET1<IMAX2) between s2~s3 and s8~s9. Between s3~s5 and s6~s8, the current controllers CC2 and CC0 are turned on, and the current controller CC1 is turned off. The current ILED is regulated by the active current controllers CC0 with the lowest current setting IMAX2 (IMAX2<ISET2) between s3~s4 and s7~s8, and by the active current controllers CC2 with the lowest current setting ISET2 (ISET2<IMAX0) between s4~s5 and s6~s7. Between s5~s6, the current controller CC0 is turned on, and the current controllers CC1 and CC2 are turned off. The current ILED is regulated by the only active current controller CC0 with the current setting IMAX0.

As illustrated in FIGS. 8 and 10 when the LED lighting device 100 is driven by the rectified AC voltage VAC at its upper bound, the current ILED' (with the current envelope controller 50 deactivated) reaches IMAX earlier and drops below IMAX later than the current ILED (with the current envelope controller 50 activated), resulting in a wider waveform which indicates a duty increase. As illustrated in FIGS. 9 and 11 when the LED lighting device 100 is driven by the rectified AC voltage VAC at its lower bound, the current ILED' (with the current envelope controller 50 deactivated) reaches IMAX later and drops below IMAX earlier than the current ILED (with the current envelope controller 50 activated), resulting in a narrower waveform which indicates a duty decrease. Without current envelope, the duty increase due to larger VAC and the duty decrease due to smaller VAC may greatly degrade the line regulation of the LED lighting device 100.

The present invention may improve the line/load regulation of the LED lighting device 100 by activating the current envelope controller 50 of the current control unit CCU in the master driving stage ST0. Even if the rectified AC voltage VAC somehow fluctuates between its upper bound and lower bound, the current envelope controller 50 is able to reduce the duty variation.

With the above-mentioned multi-stage driving scheme with line/load regulation control, the present invention may improve the effective operational voltage range and line/load regulation of an LED lighting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting device having multiple driving stages, comprising:
   a slave driving stage comprising:

a first luminescent device; and a first current controller coupled in parallel to the first luminescent device and configured to provide a constant current setting in a first phase and turn off in a second phase;

a master driving stage comprising:

a second luminescent device coupled in series to the first luminescent device for providing light according to driving current; and a current control unit coupled in series to the first and second luminescent devices and including:

a second current controller configured to provide a current envelope in the first phase and turn off in the second phase; and a current envelope controller configured to set a level of the current envelope, wherein:

the driving current is regulated by the first current controller according to the constant current setting in the first phase at a specific time during a cycle of a rectified alternative-current (AC) voltage when the constant current setting is smaller than the level of the current envelope at the specific time; or the driving current is regulated by the second current controller according to the current envelope in the first phase when the level of the current envelope at the specific time is smaller than the constant current setting.

2. The LED lighting device of claim 1, wherein the current envelop controller includes:

an oscillator configured to provide internal clock signals based on which the current envelope controller operates;

a zero-cross detection circuit configured to detect rising edges and falling edges of the driving current, thereby determining zero-cross points of the rectified AC voltage; and a control logic unit configured to adjust the level of the current envelope according to the zero-cross points of the rectified AC voltage.

3. The LED lighting device of claim 1, wherein the current envelop controller includes:

a switch configured to operate according to a first control signal;

a current detector coupled in series to the switch and configured to provide a feedback voltage whose value is associated with an equivalent resistance of the current detector and current flowing through the switch;

a reference voltage generator configured to provide a reference voltage whose value is associated with a second control signal received from the current envelop controller; and a comparator configured to provide the first control signal according to a relationship between the values of the feedback voltage and the reference voltage.

4. The LED lighting device of claim 3, wherein the current detector includes:

a plurality of resistors; and a switching circuit configured to select or deselect one or more of the plurality of resistors according to the second control signal for adjusting the equivalent resistance of the current detector.

5. The LED lighting device of claim 3, wherein the reference voltage generator includes:

a plurality of resistors forming a voltage-division circuit and configured to provide the reference voltage according to a ratio; and a switching circuit configured to adjust the ratio by selecting or deselecting one or more of the plurality of resistors according to the second control signal, thereby adjusting the value of the reference voltage accordingly.

6. The LED lighting device of claim 3, wherein:

the current detector includes:

a plurality of first resistors; and a first switching circuit configured to select or deselect one or more of the plurality of first resistors according to the second control signal for adjusting the equivalent resistance of the current detector; and the voltage generator includes:

a plurality of second resistors forming a voltage-division circuit and configured to provide the reference voltage according to a ratio; and a second switching circuit configured to adjust the ratio by selecting or deselecting one or more of the plurality of second resistors according to the second control signal, thereby adjusting the value of the reference voltage accordingly.

7. The LED lighting device of claim 1, wherein the second current controller is configured to provide the current envelope having a first current setting and a second current setting in the first phase, the first current setting is larger than the constant current setting, and the second current setting is smaller than the constant current setting.

8. The LED lighting device of claim 1 further comprising a power supply circuit configured to provide the rectified AC voltage.

9. The LED lighting device of claim 8 wherein the power supply circuit includes an AC-AC voltage converter.

10. An LED lighting device having multiple driving stages, comprising:

first to $(N+1)^{th}$ luminescent devices for providing light according to driving current;

first to $N^{th}$ current controllers coupled in parallel with the first to $N^{th}$ luminescent devices, respectively, and configured to:

provide first to $N^{th}$ constant current settings in a first phase, respectively; and turn off in a second phase;

an $(N+1)^{th}$ current controller coupled in series to the first to $(N+1)^{th}$ luminescent devices and including:

an $(N+1)^{th}$ current controller configured to provide a current envelope with $(N+1)$ current settings in the first phase and turn off in the second phase; and a current envelope controller configured to set the $(N+1)$ current settings of the current envelope, wherein:

N is an integer larger than 1; and at a specific time during a cycle of a rectified AC voltage, the driving current is regulated by a current controller among the first to $(N+1)^{th}$ current controllers which operates in the first mode and provides a smallest current setting among other current controllers operating in the first mode at the specific time.

11. The LED lighting device of claim 10, wherein the $(N+1)$ current settings of the $(N+1)^{th}$ current controller $A_1 \sim A_{N+1}$ and the first to $N^{th}$ constant current settings of the first to $N^{th}$ current controllers $B_1 \sim B_N$ have a relationship of $A_1 < B_1 < A_2 < B_2 < \ldots < A_N < B_N < A_{N+1}$.

* * * * *